Figure 1:
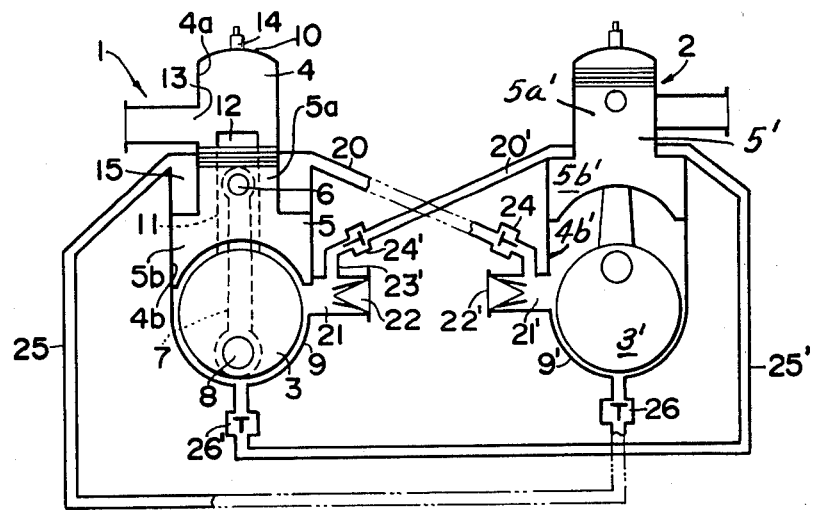

United States Patent [19]

Fujikawa et al.

[11] 4,138,971
[45] Feb. 13, 1979

[54] CRANKCHAMBER PRECOMPRESSION TYPE TWO-CYCLE INTERNAL COMBUSTION ENGINES

[75] Inventors: Tetsuzo Fujikawa, Kobe; Toshiyuki Takada, Miki, both of Japan

[73] Assignee: Kawasaki Jukogyo Kabushiki Kaisha, Kobe, Japan

[21] Appl. No.: 736,141

[22] Filed: Oct. 27, 1976

[30] Foreign Application Priority Data

Oct. 31, 1975 [JP] Japan .................................. 50-131823

[51] Int. Cl.² ............................................ F02B 75/20
[52] U.S. Cl. ............................... 123/59 BS; 123/73 F
[58] Field of Search ............... 123/59 BS, 65 S, 73 F, 123/73 A

[56] References Cited

U.S. PATENT DOCUMENTS

| 798,328 | 8/1905 | Ferrero et al. | 123/59 BS |
|---|---|---|---|
| 1,322,422 | 11/1919 | Froelich | 123/59 BS |
| 1,450,081 | 3/1923 | Henriod et al. | 123/59 BS |
| 1,505,211 | 8/1924 | Lorbach | 123/59 BS |
| 1,660,859 | 2/1928 | Burtnett | 123/59 BS |
| 2,508,391 | 5/1950 | Huntington | 123/59 BS |
| 2,771,868 | 11/1956 | Knuth | 123/73 A |
| 3,847,124 | 11/1974 | Kramer | 123/59 BS |
| 3,859,967 | 1/1975 | Turner et al. | 123/73 A |

FOREIGN PATENT DOCUMENTS 181975  6/1922  United Kingdom ............... 123/59 BS

*Primary Examiner*—Charles J. Myhre
*Assistant Examiner*—David D. Reynolds
*Attorney, Agent, or Firm*—Stevens, Davis, Miller & Mosher

[57] ABSTRACT

Twin cylinder two cycle engine including a pair of stepped cylinders and a pair of stepped pistons slidable in said cylinders defining annular spaces of variable volume in said cylinders. The pistons are interconnected each other with 180° phase difference. Air-fuel mixture introduced into the annular space in one cylinder is forced into the crankchamber of the other cylinder during the upward stroke of the associated piston, so that an additional charge is provided.

1 Claim, 2 Drawing Figures

CRANKCHAMBER PRECOMPRESSION TYPE TWO-CYCLE INTERNAL COMBUSTION ENGINES

The present invention relates to internal combustion engines and more particularly to multiple-cylinder type two cycle internal combustion engines.

In crank-chamber precompression type two cycle engines, intake gas is introduced in the form of air or air-fuel mixture into the crank-chamber wherein the gas is compressed to some extent under the downward stroke of the piston and introduced through scavenging passage and scavenging ports into the combustion chamber. When it is desired to provide an increased supply of such intake gas for attaining a high output performance in this type of engines, it has been required to additionally provide a supercharge such as a mixture charging pump. However, such provision of a supercharger will require an additional space for mounting it and further increases the manufacturing cost.

The present invention has therefore an object to provide a crank-chamber precompression type two cycle internal combustion engine which has means for providing an increased charge of intake gas.

Another object of the present invention is to provide a multiple cylinder two cycle engine wherein the piston movement in one cylinder is utilized for charging the other cylinder.

A further object of the present invention is to provide a crank-chamber precompression type engine wherein a supercharging effect can be obtained without addition of any substantial component.

According to the present invention, the above and other objects can be accomplished by a two cycle internal combustion engine comprising a first cylinder having a stepped bore which is constituted by a first small diameter and a first large diameter cylinder portions, a first stepped piston having a shoulder formed by a first small diameter and a first large diameter piston portions, said first small and large diameter piston portions being in sliding engagement with said first small and large diameter cylinder portions, respectively, providing a first annular space of variable volume in said first large diameter portion of the first cylinder and also a first combustion chamber in said first small diameter cylinder portion, a first crank-chamber which is connected through first scavenging passage means with said first combustion chamber, a second cylinder having a stepped bore which is constituted by a second small diameter and a second large diameter cylinder portions, a second stepped piston having a shoulder formed by a second small diameter and a second large diameter piston portions, said second small and large diameter piston portions being in sliding engagement with said second small and large diameter portions, respectively, providing a second annular space of variable volume in said second large diameter portion of the second cylinder and also a second combustion chamber in said second small diameter cylinder portion, a second crank-chamber which is connected through second scavenging passage means with said second combustion chamber, means for connecting said first and second pistons each other with 180° phase difference, communicating passage means for connecting said first annular space with at least one of said second crank-chamber and said second scavenging passage means, and for connecting said second annular space with at least one of said first crank-chamber and said first scavenging passage means, and means for introducing intake gas into said first and second annular space.

According to the present invention, the intake gas which may be in the form of air-fuel mixture or air is at first compressed to some extent in the annular space of one cylinder under the upward stroke movement of the piston in said cylinder, and introduced into the crank-chamber which is associated with the other cylinder. The intake gas is then further compressed and introduced into the combustion chamber in said other cylinder under the downward stroke of the associated piston. The arrangement is effective to provide a supercharging function without any additional device such as a conventional supercharger. Thus, the present invention makes it possible to design an engine which can provide a high output but is compact as compared with an engine having a conventional supercharger. It should further be noted that, according to the present invention, the scavenging efficiency can be significantly improved by increasing the compression ratio of each annular space.

Figure 2:
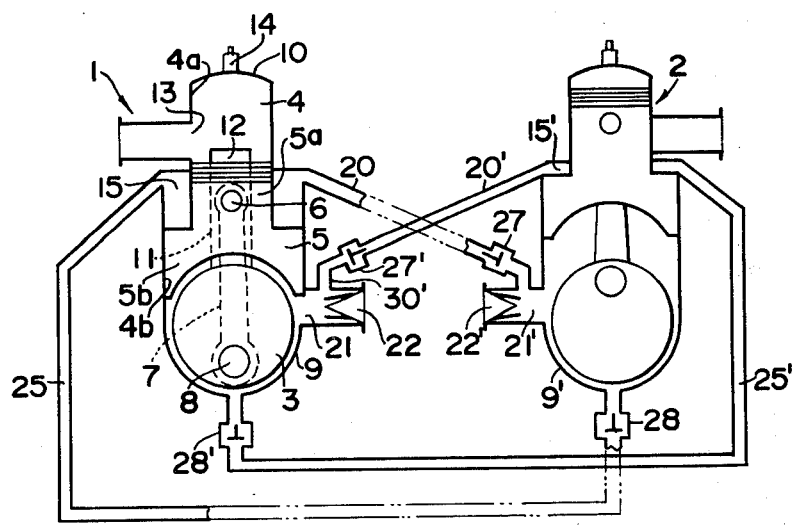

The above and other objects and features of the present invention will become apparent from the following descriptions of preferred embodiments of the invention taking reference to the accompanying drawings, in which:

FIG. 1 is a schematic sectional view of a crank-chamber precompression type two cycle engine in accordance with one embodiment of the present invention; and FIG. 2 is a sectional view similar to FIG. 1 but showing a further embodiments of the present invention.

Referring now to FIGS. 1 and 2, the engine shown therein includes a first and second cylinder assemblies 1 and 2, respectively. The first cylinder assembly 1 comprises a cylinder 10 having a cylinder bore 4 which includes a small diameter and a large diameter cylinder portions 4a and 4b, respectively. In the cylinder bore 4, there is disposed a stepped piston 5 having a small diameter and a large diameter piston portions 5a and 5b, respectively, which are slidable in the corresponding portions 4a and 4b of the cylinder bore 4. Thus, an annular chamber 15 of variable volume is defined in the large diameter cylinder portions 4b.

Beneath the piston 5, there is defined a crank-chamber 9 in which a crankshaft 3 is arranged in a manner well known in the art. The crankshaft 3 is connected with the piston 5 through a connecting rod 7 which is connected to the piston 5 and the crankshaft 3 by means of a piston pin 6 and a crank-pin 8, respectively. The cylinder 10 is formed at its small diameter portion 4a with scavenging ports 12 which communicate through scavenging passages 11 with the crank-chamber 9. The small diameter portion 4a is also formed with an exhaust port 13. The cylinder 10 is provided with an ignition plug 14.

The second cylinder assembly 2 has a structure which is quite similar to the first cylinder assembly 1. Therefore, corresponding parts in the second cylinder assembly 2 are shown by the same reference numerals as those used for the parts in the first cylinder assembly 1 but detailed descriptions of the second cylinder assembly 2 will be omitted. The crankshafts 3 and 3' of the first and second cylinder assemblies 1 and 2 are interconnected in such a manner that, when the piston in one cylinder assembly is at the top dead center, the other piston is at the bottom dead center.

In the arrangement shown in FIG. 1, the crank-chamber 9 of the first cylinder assembly 1 is provided with an intake passage 21 having a reed type check valve 22. Similarly, the crank-chamber 9' is provided with an intake passage 21' having a reed type check valve 22'. The annular space 15 of the first cylinder assembly 1 is connected with the crank-chamber 9' of the second cylinder assembly 2 through a passage 20 having a check valve 24 which allows fluid flow only toward the annular space 15. The annular space 15 of the first cylinder assembly 1 is further connected with the bottom of the crank-chamber 9' in the second cylinder assembly 2 through a passage 25 having a check valve 26 which opens only toward the crank-chamber 9'. Similarly the annular space 15' in the second cylinder assembly 2 is connected with the crank-chamber 9 of the first cylinder assembly 1 through a passage 20' having a check valve 24' and through a passage 25' having a check valve 26'.

In this arrangement, during the downward stroke of the piston 5, a part of the mixture introduced into the crank-chamber 9 is directed to the annular chamber 15' in the second cylinder assembly 2 through the passage 20' then forced to flow through the passage 25' and the check valve 26' into the bottom of the crank-chamber 9 of the first cylinder assembly 1. The arrangement is therefore advantageous in that the mixture flow thus introduced into the crank-chamber 9 through the passage 25' serves to disperse lubricant oil which may otherwise be accummulated in the bottom part of the crank-chamber 9. Thus, it is possible in this embodiment to prevent any tendency of such accummulated oil being instantaneously taken into the combustion chamber during rapid acceleration of the engine.

The embodiment shown in FIG. 2 is different from the embodiment shown in FIG. 1 only in respect of the functions of the check valves. Thus, the passages 20 and 20' for connecting the annular spaces 15 and 15' with the crank-chambers 9 and 9' are respectively provided with check valves 27 and 27' which open only in the directions of the crank-chambers 9' and 9. Further, the passages 25 and 25' for connecting the annular spaces 15 and 15' with the bottom parts of the crank-chambers 9' and 9, respectively, are provided with check valves 28 and 28' which allow fluid flow only toward the annular spaces 15' and 15. In this embodiment, lubricant oil deposited on the bottom walls of the crank-chambers 9 and 9' is forced to flow together with the mixture in the crank-chambers into the annular spaces 15' and 15, and, from the annular spaces, it is returned to the respective crank-chambers 9 and 9'. Thus, it is possible to prevent any tendency of lubricant oil being accummulating at the bottom parts of the crank-chambers.

The present invention has thus been shown and described with reference to specific embodiments, however, it should be noted that the invention is in no way limited to the details of the illustrated structures but changes and modifications may be made without departing from the scope of the appended claims.

We claim:

1. Two cycle internal combustion engine comprising a first cylinder having a stepped bore which is constituted by a first small diameter portion and a first large diameter cylinder portion, a first stepped piston having a shoulder formed by a first small diameter portion and a first large diameter piston portion, said first small and large diameter piston portions being in sliding engagement with said first small and large diameter cylinder portions, respectively, providing a first annular space of variable volume in said first large diameter portion of the first cylinder and also a first combustion chamber in said first small diameter cylinder portion, a first crank-chamber which is connected through first scavenging passage means with said first combustion chamber, a second cylinder having a stepped bore which is constituted by a second small diameter portion and a second large diameter cylinder portion, a second stepped piston having a shoulder formed by a second small diameter portion and a second large diameter piston portion, said second small and large diameter piston portions being in sliding engagement with said second small and large diameter portions, respectively, providing a second annular space of variable volume in said second large diameter portion of the second cylinder and also a second combustion chamber in said second small diameter cylinder portion, a second crank-chamber which is connected through second scavenging passage means with said second combustion chamber, means for connecting said first and second pistons to each other with 180° phase difference, communicating passage means for connecting said first annular space with said second crank-chamber at the bottom thereof, and for connecting said second annular space with said first crank-chamber at the bottom thereof, intake passage means, said first and second annular spaces being connected with said intake passage means, and said communicating passage means being provided with check valve means for allowing gas flow only toward the crank-chambers.

* * * * *